POLYMERIZATION OF CYCLIC ETHERS USING A CATALYST SYSTEM COMPRISING ALUMINUM HALIDE ETHERATE

Junji Furukawa and Takeo Saegusa, Kyoto, and Hirosuke Imai, Takatsuki, Japan, assignors to Nippon Oil Company, Limited, Tokyo, Japan, a corporation of Japan
No Drawing. Filed Aug. 14, 1964, Ser. No. 389,786
Claims priority, application Japan, Aug. 19, 1963, 38/44,252
12 Claims. (Cl. 260—67)

The present invention relates to a method of polymerizing cyclic ethers by using a new catalyst.

It has heretofore been known that cyclic ethers of 3 membered ring, 4 membered ring, 5 membered ring and 6 membered ring can perform a ring opening polymerization by cation mechanism with a so-called Friedel-Crafts type catalyst to provide polyethers. For instance, when an alkylene oxide which is a cyclic ether of 3 membered ring is polymerized by using aluminum chloride, boron trifluoride or ferric chloride as a catalyst, an oily polymer having a comparatively low degree of polymerization is obtained. Trimethylene oxide which is a cyclic ether of 4 membered ring and derivatives thereof, such as 3,3-bis(chloromethyl)oxacyclobutane can be polymerized by using boron trifluoride or its coordination compound as a catalyst. Tetrahydrofuran which is a cyclic ether of 5 membered ring can be polymerized by using a catalyst system consisting of a Friedel-Crafts catalyst such as aluminum chloride and a suitable co-catalyst. Trioxymethylene of 6 membered ring (cyclic trimer of formaldehyde) can be polymerized at a comparatively high temperature by using $BF_3$ or the coordination compound thereof as a catalyst. Thus the Friedel-Crafts type catalysts have been used as polymerization catalysts for cyclic ethers but they have disadvantage that the polymers are of comparatively low degree of polymerization, so that the condition of polymerization should be extraordinarily strictly defined.

After various attempts to find a successful method to overcome above disadvantage, the inventors have now accomplished a novel method for the polymerization of cyclic ethers. The present invention is based on the inventor's discovery that a non-volatile thermal cracking residue of an aluminum halide etherate or catalyst system consisting of a thermal cracking residue of aluminum halide etherate and a co-catalyst combined therewith has comparatively higher catalytic activity than that of aluminum halide etherate itself, and when a cyclic ether is polymerized in the presence of such catalyst polymers having higher degree of polymerization and excellent physical properties are obtained.

The catalysts used in the method of the invention comprises as the principal components thereof non-volatile residue produced by the thermal cracking of an aluminum halide etherate. The cracking reaction of an aluminum halide etherate may be shown by the following formula:

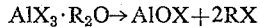

wherein X is a halogen atom such as fluorine, chlorine, bromine or iodine and R represents aliphatic or aromatic hydrocarbon radical.

In the above reaction, alkyl halide RX is removed from the reaction system as volatile substance so that when the reaction is completed major part of AlOX remains as the non-volatile residue.

However, the thermal cracking reaction does not always proceed as exactly as shown in the above formula and in some cases there may remain in addition to AlOX, aluminum halide, alumina and aluminum alkoxide in the non-volatile residue. Accordingly, the catalyst of the present invention is not limited to a simple chemical compound AlOX.

Aluminum halide etherate which is the raw material for the preparation of the catalyst of the invention may be expressed by the following general formula:

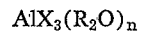

wherein X represents a halogen atom such as fluorine, chlorine, bromine or iodine, R represents an aliphatic or aromatic hydrocarbon radical and $n$ is an integer greater than one. The thermal cracking of such etherates of aluminum halides is performed at a temperature of from 50 to 500° C., preferably 100 to 300° C. without solvent or in a suitable inert solvent. The residue obtained by the reaction may be used at that state directly as the polymerization catalyst or the residue obtained may be washed with a suitable solvent such as alkyl halide or hydrocarbons to eliminate the soluble portion before use.

The catalyst thus prepared has excellent catalytic activity for the polymerization of cyclic ether. By adding a suitable co-catalyst thereto the catalytic activity for the polymerization of cyclic ethers of 3 membered, 4 membered, 5 membered and 6 membered ring can be greatly increased. Suitable co-catalysts are usually such compounds which produce carbonium ion or oxonium ion by reacting with Lewis acids and such compounds are as follows.

(1) Compounds forming carbonium ion by reacting with Lewis acids:

(a) α-haloalkyl ether (for example monochlorodimethyl ether, 2,3-dichlorotetrahydrofuran etc.).
(b) Acid anhydrides, acid chlorides or acid esters (for instance, acetic anhydride, acetyl chloride, benzoyl chloride etc.).
(c) Strong acid salts (for instance, dialkylsulfate, aryl sulfonates etc.).
(d) Alkyl halides and aryl halides (for instance, t-butyl chloride, benzyl chloride, benzotrichloride, etc.).

(2) Compounds forming oxonium ions by reacting with Lewis acids:

(a) Alkylene oxides (for example epichlorohydrin, epibromohydrin, epifluorohydrin, epiiodohydrin, ethylene oxide, propylene oxide, styrene oxide, butadiene monoxide, 2,3-epoxybutane etc.).
(b) Ketene, diketene and derivatives thereof.
(c) Azo and diazo compounds (for example diazo methane).

It is considered that such co-catalysts react with the thermally cracked products of an aluminum halide etherate to create carbonium ion or oxonium ion and accelerate the polymerization of cyclic ethers.

In the polymerization of alkylene oxide any further addition of alkylene oxide as catalyst is not necessary. However, in the polymerization of cyclic ethers of 4 membered ring, 5 membered ring or 6 membered ring the addition of alkylene oxide as the catalyst is effective.

The cyclic ethers which may be used in the present invention include the following:

(1) Cyclic ethers of 3 membered ring: alkylene oxides for example, ethylene oxide, propylene oxide, isobutylene oxide, 1-butene oxide, cis-2-butene oxide, trans-2-butene oxide, trimethylethylene oxide, tetramethylethylene oxide, butadiene monoxide, styrene oxide, α-methylstyrene oxide, 1,1-diphenylethylene oxide, epichlorohydrin, epifluorohydrin, epibromohydrin, epiiodohydrin, 1,1,1-trifluoro-2-propylene oxide, 1,1,1-trifluoro-2-methyl-2-propylene oxide, 1,1,1-trifluoro-2-methyl-3-chloro-2-propylene oxide, 1,1,1-trifluoro-2-butene oxide, 1,1,1-trifluoro-2-pentene oxide, 1,1,1-trifluoro-2-isopentene oxide, 1,1,1,2,2,3,3-heptafluoro-4-hexene oxide, 1,1,2,2,3,3-heptafluoro-4-heptene oxide, 1,1,1,2,2,3,3-heptafluoro-4-isoheptene oxide, hexyl glycidyl ether, alkyl glycidyl ether, phenyl glycidyl ether, 2-chloroethyl glycidyl ether, o-chlorophenyl glycidyl ether, methallyl chloride epoxide, cylohexene oxide, dihydronaphthalene oxide, vinyl cyclohexene monoxide etc.

(2) Cyclic ethers of 4 membered ring: trimethylene oxide having the following general formula and the derivatives thereof:

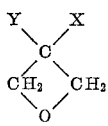

wherein X and Y may be same or different and represent hydrogen atom, methyl, chloromethyl, fluoromethyl, bromomethyl, iodomethyl, $CH_3OCH_2$, $CH_2OCOCH_2$, $$CH_2OC_2H_5$$

or $CH_2CN$ group, or X and Y may be members which combine together to constitute another ring, such as in the case of dioxaspiroheptane.

(3) Cyclic ethers of 5 membered ring:

(a) Tetrahydrofuran and the derivatives thereof, such as 1,4-epoxycyclohexane, endo- or exo-2-methyl-7-oxabicycloheptane and 8-oxabicyclo (4:4:0)nonane.
(b) 1,3-dioxolane and the derivatives thereof.

(4) Cyclic ethers of 6 membered ring: trioxane.

When a mixture of two or more of the cyclic ethers of the same or different ring member numbers described above are polymerized using the catalyst of the invention there may be produced copolymers or a mixture of homopolymers of the cyclic ethers used.

The quantity of thermally cracked residue of aluminum halide etherate to be used as the catalyst is from $1 \times 10^{-5}$ g. atom to 1 g. atom per mole of monomer calculated on Al, preferably $1 \times 10^{-4}$ to $1/10$ g. atom, and the suitable quantity of the cocatalyst calculated on 1 g. atom of Al is from $1 \times 10^{-4}$ to 1 mole per mole of the monomer. Next, the polymerization by means of such catalyst system is performed by bulk polymerization or solution polymerization, within the temperature range of from −100 to 250° C. In case of solution polymerization use may be made of any organic solvents which do not effect adversely to the polymerization as the polymerization catalyst. Such organic solvents are aliphatic hydrocarbons, aromatic hydrocarbons, alkyl halides or aryl halides.

The invention will be further explained in detail with reference to examples.

Examples 1–4.—Polymerization of epichlorohydrin 50 ml. of ether solution of $AlCl_3 \cdot Et_2O$ (0.5 mol./lit.) were introduced into a conical flask purged by nitrogen and ether was driven out while heating on an oil bath. Then the temperature of the bath was raised to 160° C. and at that time, violent creation of ethyl chloride was observed, but the creation had completed in about 10 minutes, yet the reaction mixture was heated at 160° C. for about three hours and then heated at 160° C. under a reduced pressure. The non-volatile thermally cracked product by this process was yellow brown colored brittle solid which was pulverized. It was placed in a dry box to prevent the deactivation by moisture in the air. The polymerization was performed in a test tube purged by nitrogen under the following condition:

Epichlorohydrin _____mole__ 0.1
Catalyst (calculated on Al) _____g. atom__ 0.005
Quantity of solvent_____ml__ 40
Polymerization temperature _____° C__ 0
Polymerization time_____hours__ 24

| Example | Solvent | Polymer yield (percent) | Appearance of polymer |
|---|---|---|---|
| 1 | None | 89.4 | Wax like. |
| 2 | n-Hexane | 57.9 | Do. |
| 3 | Methylene chloride | 7.27 | Rubbery. |
| 4 | Toluene | 6.59 | Resinous. |

The polymers produced by Examples 1 to 3 were non-crystalline polymers while polymer obtained by Example 4 was crystalline polymer determined by infrared absorption spectrum.

Examples 5–8.—Polymerization of propylene oxide

Propylene oxide was polymerized by using the residue obtained by thermal cracking aluminum chloride diethyl etherate in the method of Example 1 as catalyst. The conditions of polymerization and the results are as shown in the following:

Propylene oxide _____mole__ 0.1
Catalyst (calculated on Al) _____g. atom__ 0.005
Quantity of solvent_____ml__ 40
Polymerization temperature _____° C__ 0
Polymerization time_____hours__ 24

| Example | Solvent | Polymer yield (percent) | Appearance of polymer |
|---|---|---|---|
| 5 | None | 25.5 | Resinous. |
| 6 | n-Hexane | 21.0 | Wax like. |
| 7 | Methylene chloride | 21.8 | Do. |
| 8 | Toluene | 12.5 | Do. |

The polymers obtained by Examples 7 to 8, were rich in non-crystalline portion according to infrared absorption spectrum, but the polymer obtained by Example 5 contained a large quantity of crystalline polymer.

Examples 9–16.—Polymerization of 3,3-bis(chloromethyl)oxacyclobutane 3,3-bis(chloromethyl)oxacyclobutane was polymerized by using a catalyst system comprising the thermally cracked residue of aluminum chloride diethyl etherate prepared by the method of Example 1 as the catalyst and of the following compounds as co-catalyst. The conditions of polymerization and the results are as follows:

BCMO _____mole__ 0.025
Catalyst (calculated on Al)_____g. atom__ 0.00125
Co-catalyst _____mole__ 0.00125
Quantity of solvent, methylene chloride ___ml__ 20
Polymerization temperature _____° C__ 0
Polymerization time_____hours__ 24

| Example | Co-catalysts | Solvent | Polymer Yield (Percent) |
|---|---|---|---|
| 9 | None | None | 14.6. |
| 10 | do | Methylene chloride | Little. |
| 11 | Epichlorohydrin | None | About 100. |
| 12 | do | Methylene chloride | Do. |
| 13 | Propylene oxide | None | 21.8. |
| 14 | do | Methylene chloride | 11.5. |
| 15 | Monochlorodimethyl | do | Little. |
| 16 | t-Butyl chloride | do | Do. |

All of the polymers thus obtained were white colored resinous substances having a high degree of polymerization.

Examples 17–19.—Polymerization of tetrahydrofuran

Tetrahydrofuran was polymerized by using a catalyst system comprising the product prepared by the method of Example 1 as the catalyst and of the following compounds as co-catalyst.

Polymerization and results are as follows:

THF _____mole__ 0.25
Catalyst (calculated on Al) _____g. atom__ 0.0025
Co-catalyst _____mole__ 0.0025
Polymerization temperature _____° C__ 0
Polymerization time_____hours__ 24
Bulk polymerization.

| Example | Co-catalyst | Polymer yield (percent) |
|---|---|---|
| 17 | None | 0 |
| 18 | Epichlorohydrin | 34.5 |
| 19 | Propylene oxide | 27.1 |

The polymer thus obtained was white colored resinous substance having high degree of polymerization.

Examples 20–24.—Polymerization of 1,3-dioxolane 1,3-dioxolane was polymerized by using a catalyst system comprising the product prepared by the method of Example 1 and of a suitable co-catalyst as the secondary component.

The conditions of polymerization and results are shown below:

1,3-dioxolane _____ mole__ 0.1
Catalyst (calculated on Al) _____ g. atom__ 0.005
Co-catalyst _____ mole__ 0.005
Polymerization temperature _____° C__ 0
Polymerization time _____ hours__ 24
Bulk polymerization.

| Example | Co-catalyst | Polymer yield (percent) |
|---|---|---|
| 20 | None | 13.4 |
| 21 | Epichlorohydrin | 48.6 |
| 22 | Propylene oxide | 37.3 |
| 23 | Monochlorodimethyl ether | 21.5 |
| 24 | t-Butyl chloride | 17.7 |

The polymer thus obtained has wax like appearance and soluble in water.

Example 25.—Polymerization of trioxane

By using the catalyst prepared by the method of Example 1 trioxane was polymerized.

0.05 mole of trioxane and 35 ml. of methylene chloride were introduced into a test tube purged by nitrogen, which was added with a suspension of the residue obtained by thermal cracking aluminum chloride diethyl etherate in methylene chloride (0.0001 mol) while maintaining at 30° C. and was sealed, after which the reaction mass was left at 35° C. for 24 hours to polymerize.

The polymer thus obtained had white colored resinous substance and the yield was about 46.9%.

Example 26

0.05 mol of epichlorohydrin, 0.05 mol of allyl glycidyl ether and 40 ml. of toluene were introduced into a test tube purged by nitrogen, and the system which was added with a suspension of thermal cracked residue of aluminum chloride diethyl etherate in toluene (0.001 mol) while maintaining at 0° C. and after sealing the tube the reaction mass was polymerized at 30° C. for 24 hours.

After the completion of polymerization the polymerized system was dropped into methanol acidified with hydrochloric acid and the polymer was filtered off and dried under a reduced pressure to yield white rubbery polymer of 4.27 g.

What we claim is:

1. A method of polymerizing cyclic ethers which comprises polymerizing at a temperature of from about $-100°$ to about $250°$ C. an ether selected from the group consisting of a cyclic ether and a mixture of cyclic ethers in the presence of a cataylst system comprising from about $1 \times 10^{-5}$ to about 1 gram atom calculated as aluminum per mole of ether of the non-volatile residue produced by the thermal decomposition of an aluminum halide etherate.

2. A method according to claim 1 wherein said catalyst system additionally contains from about $1 \times 10^{-4}$ to about 1 mole per mole of monomer of a co-catalyst capable of liberating an ion selected from the group consisting of carbonium and oxonium ions on reaction with a Lewis acid.

3. A method of polymerizing cyclic ethers according to claim 2, wherein said co-catalyst is selected from the group consisting of alpha-haloalkyl ethers, acid anhydrides, acid chlorides, acid esters, strong acid salts, alkyl halides, aryl halides, alkylene oxides, ketenes, diketenes and derivatives thereof, and azo and diazo compounds.

4. A method according to claim 1, wherein the polymerization is carried out in the presence of an inert solvent.

5. A method according to claim 1 wherein the cyclic ether is epichlorohydrin.

6. A method according to claim 1, wherein the cyclic ether is propylene oxide.

7. A method according to claim 2, wherein the cyclic ether is 3,3-bis(chloromethyl)oxacyclobutane.

8. A method according to claim 2, wherein the cyclic ether is tetrahydrofuran.

9. A method according to claim 2, wherein the cyclic ether is 1,3-dioxolane.

10. A method according to claim 2, wherein the cyclic ether is trioxane.

11. A method as in claim 1 wherein the mixture of cyclic ethers is selected from the group consisting of alkylene oxide, trimethylene oxide, tetrahydrofuran, 1,3-dioxolane, trioxane and derivatives thereof.

12. A method as in claim 2 wherein the mixture of cyclic ethers is selected from the group consisting of alkylene oxide, trimethylene oxide, tetrahydrofuran, 1,3-dioxolane, trioxane and derivatives thereof.

No references cited.

JOSEPH L. SCHOFER, *Primary Examiner.*

H. WONG, *Assistant Examiner.*